Nov. 22, 1955    H. M. ROBINSON    2,724,407
AUTOMATIC EMERGENCY VALVE
Filed Dec. 2, 1954    3 Sheets-Sheet 1
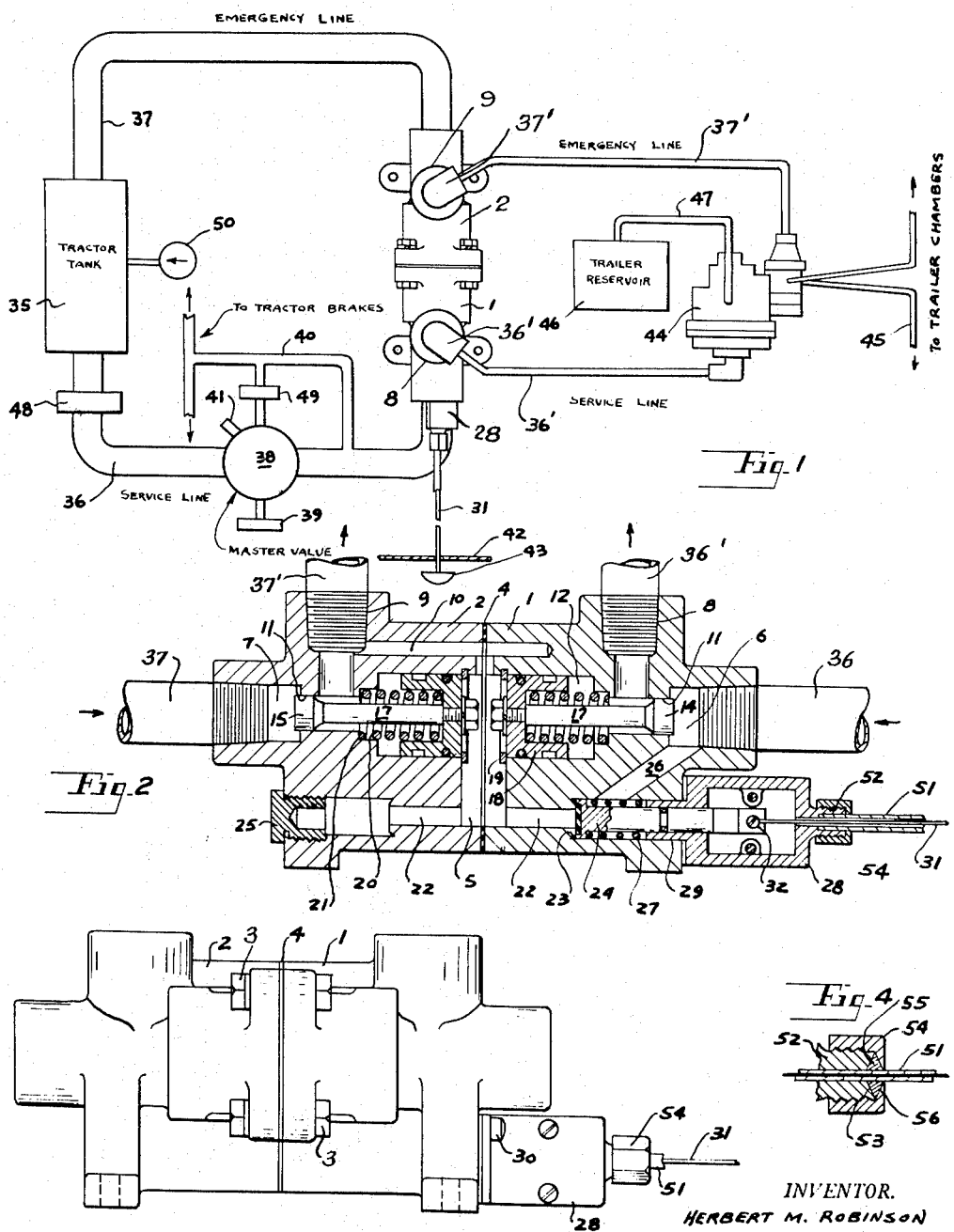
INVENTOR.
HERBERT M. ROBINSON
BY
Samuel Weisman
ATTORNEY.

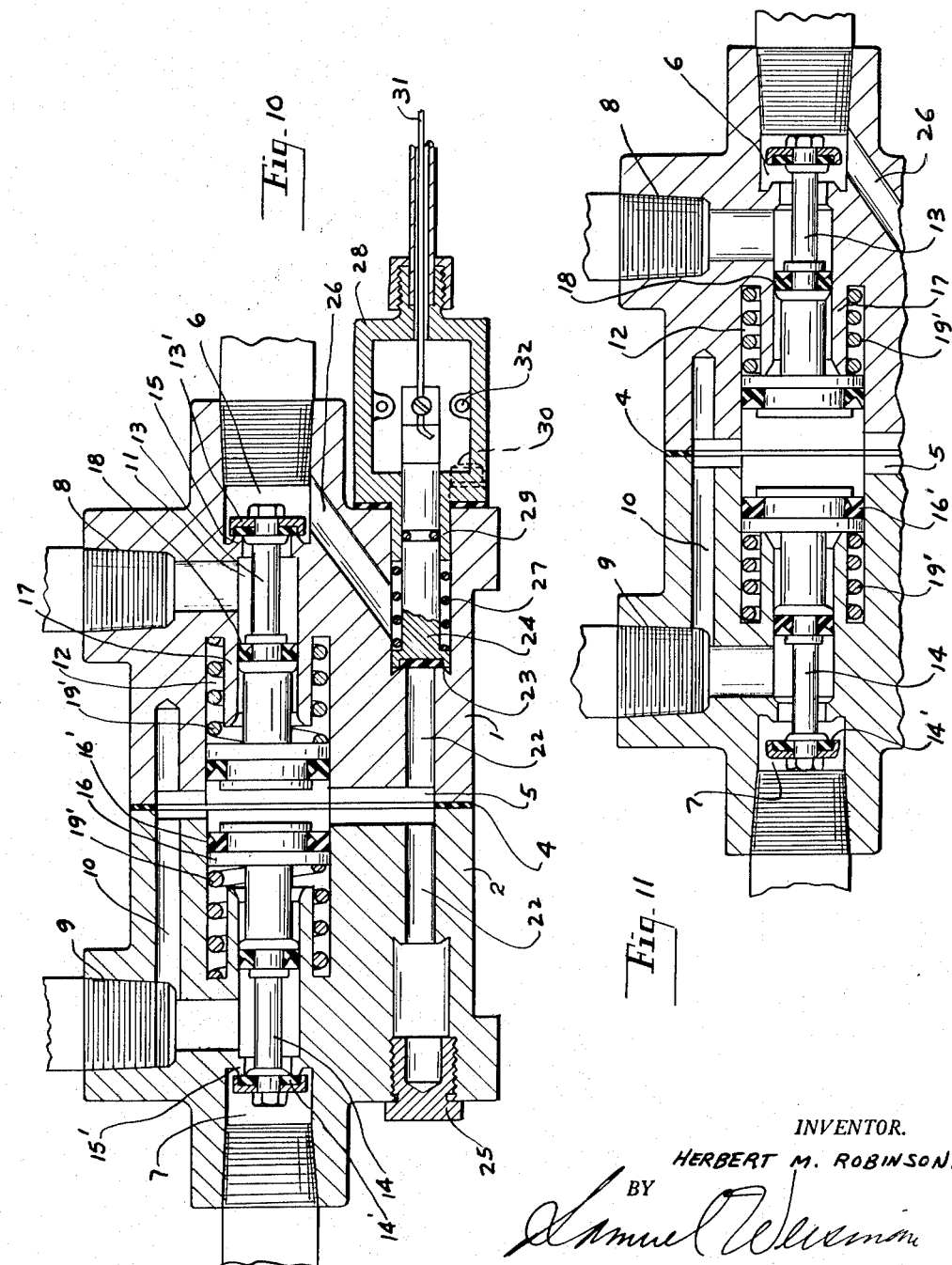

Nov. 22, 1955  H. M. ROBINSON  2,724,407
AUTOMATIC EMERGENCY VALVE
Filed Dec. 2, 1954  3 Sheets-Sheet 3
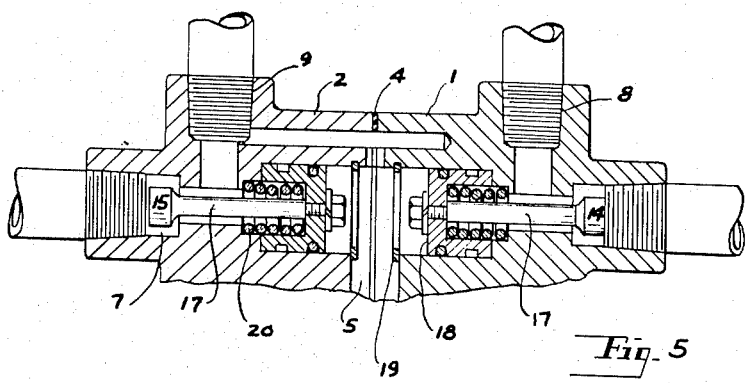
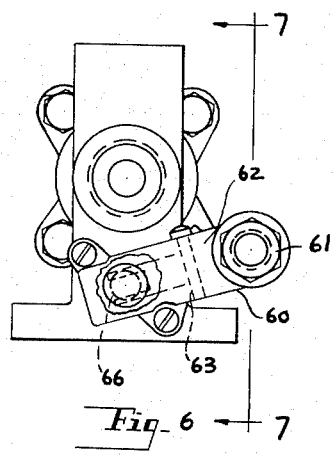
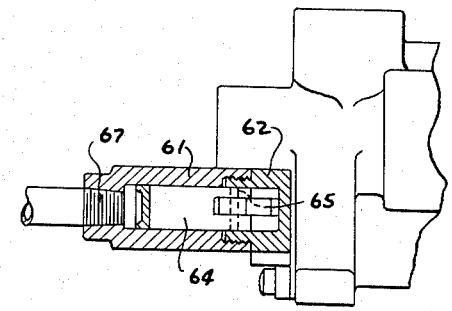
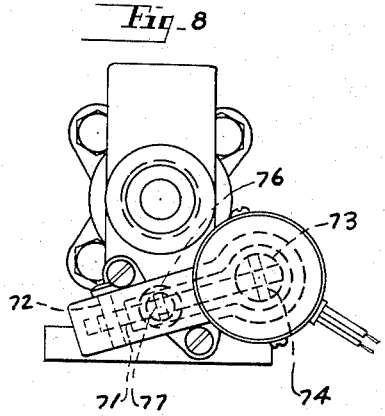
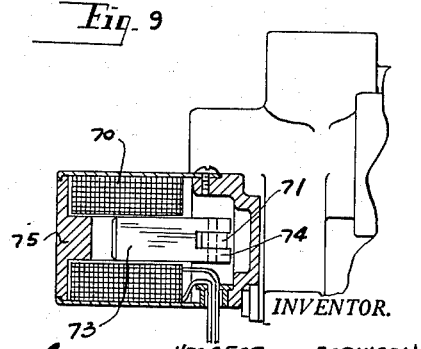
INVENTOR.
HERBERT M. ROBINSON
BY
ATTORNEY.

United States Patent Office 2,724,407
Patented Nov. 22, 1955

2,724,407

AUTOMATIC EMERGENCY VALVE

Herbert M. Robinson, Detroit, Mich., assignor to Robinson Products, Inc., Detroit, Mich., a corporation of Michigan Application December 2, 1954, Serial No. 472,646

6 Claims. (Cl. 137—595)

The present invention pertains to a novel automatic emergency valve for use in the braking system of a tractor-trailer combination.

The laws of most states require that the trailer be equipped with a braking system that operates automatically in the event that the trailer brakes become accidentally disconnected from the braking system on the tractor. For this purpose, the trailer carries a so-called emergency application valve which applies the trailer brakes automatically under emergency conditions. Such conditions, at the same time, usually exhaust the pressure fluid tank on the tractor and also introduce a time delay in the operation of the trailer brakes. The disadvantages resulting from such operation are that the tractor tank pressure is not fully available for operation of the tractor brakes, and the time lag in the emergency operation of the trailer brakes is liable to result in serious damage.

The principal object of this invention is to provide an automatic emergency valve through which the braking system on a tractor is connected to the braking system on the trailer. In normal running, this valve maintains communication from the tractor braking system to a trailer braking system. In most emergencies a fluid pressure maintained in the valve will drop and the valve will close under spring pressure, thereby preserving the pressure in the tractor tank for normal operation of the tractor brakes. At the same time, the reduced pressure will operate the emergency application valve in a manner known in the art.

A leak in the service line alone will not automatically close the valve and will be discovered by the driver when he attempts to apply the brakes, although no serious damage will be caused in the interim. For this condition and for other situations in the coupling and uncoupling of the tractor and trailer as described in detail hereinafter, the automatic emergency valve is fitted with a pilot or control valve operable from the driver's seat. When the driver opens this control valve under the proper circumstances, the fluid pressure in the automatic valve is reduced and the valve closes, whereby to close off the tractor tank and reduce the emergency line pressure to operate the emergency application valve and the trailer brakes with the tractor tank pressure sealed off from any line break or leak, the tractor brakes may be applied normally by operation of the usual brake pedal in any of the emergencies or conditions referred to above.

The invention is fully disclosed by way of example in the following description and in the accompanying drawings in which Figure 1 is diagrammatic plan view of the system;

Figure 2 is a cross section of the valve in closed position;

Figure 3 is a plan view of the valve;

Figure 4 is a detail of Figure 2;

Figure 5 is a cross section of the valve in open position;

Figure 6 is an end view of a modification;

Figure 7 is a section on the line 7—7 of Figure 6;

Figure 8 is an end view of a modification;

Figure 9 is a vertical section thereof;

Figure 10 is a longitudinal cross section of a preferred modification of the valve, in closed position, and Figure 11 is a similar section of the same valve in open position.

Reference to these views will now be made by use of like characters which are employed to designate corresponding parts throughout.

The valve assembly includes a pair of housing sections 1 and 2 bolted together at 3, with an intervening gasket 4 after receiving an assembly of parts therein. A central chamber 5 is formed at opposite sides of the gasket for a purpose that will presently appear.

The sections 1 and 2 are formed with axial inlets 6 and 7 from which extend lateral outlets 8 and 9 respectively. A longitudinal passage 10 connects the chamber 5 to the outlet 9.

The inlets 6 and 7 extend the entire length of the respective sections 1 and 2. They are preferably reduced at 11 where they cross the outlets 8 and 9 and enlarged again at 12 at the inner end. In the reduced portions 11 are slidably mounted valve heads or slip-in valves 14 and 15 respectively with stems 17 extending through the enlarged chambers 12. To the inner end of each valve stem is secured a piston 18 slidable in the corresponding chamber 12. Each piston bears inwardly against a stop-ring 19 fixed to the corresponding section 1 or 2. Each piston is also pressed against the corresponding ring by a coil spring 20 formed in the corresponding section.

Each housing section is formed with another longitudinal passage 22 from the outer end of the section to the chamber 5, and each such passage is formed with a valve seat 23 against which a valve plug 24 closes inwardly. The passage 22 is required in only one of the housing sections and is provided in both sections merely for uniformity and interchangeability of sections. The passage 22 that is not needed is plugged at 25. The passage that is used is connected by a duct 26 from a point behind its seat 23 to the inlet 7 at a point behind the restriction 11 thereof.

The valve 24 is partly surrounded and engaged by a coil spring 27. A smaller housing 28 has a reduced end 29 inserted in the passage 22 to compress the spring and is bolted at 30 to the section 1. Within the smaller housing 28, the pull wire 31 is attached at 32 to the outer end of the valve 24.

In the diagram shown in Figure 1, the valve assembly and the compressed air tank 35 are both carried by the tractor. A service line 36 connects the tank to the inlet 6, and an emergency line 37 connects the tank to the inlet 7. The service line 36 contains the usual master control valve 38 operated by a pedal 39 and connected by lines 40 to the tractor brakes in the usual manner. The valve 38 also has the usual exhaust port 41. The wire 31 is passed through the dashboard 42 and is fitted at its end with a pull knob 43.

The service line 36 is extended at 36' to a relay or emergency application valve 44. Such a valve is familiar in the art and is shown in the patents to Robinson No. 2,084,707 of June 22, 1937, and Williams, No. 2,451,139 of October 12, 1948. From a portion of the valve 44, lines 45 extend to the trailer brakes.

The emergency line 37 is continued at 37' at the outlet 9 to the same portion of the valve 44. An air reservoir 46 on the tractor is connected by a line 47 to the body of the valve 44. Quick release valves 48 and 49 are mounted in the service line 36 and in the tractor brake line 40, serving and comparatively close to the forward and rear tractor brakes respectively. These valves are known in the art, and their function is to exhaust the brakes in less time than it takes the exhaust fluid to reach the exhaust port 41 at the master valve 34. The reservoir 35 is supplied from a compressor 50.

With reference to some of the details of construction, the wire 31 is enclosed in an armor 51 which is attached to the housing 28 by a compression coupling. The outer end of the housing 28 is formed with a threaded box 52 having a rounded or convex extremity 53. A cap nut 54 is slipped over the armor 51 after the application of a double conical gland 55. The gland seats against the end 53 and is also received in a conical seat 56 in the top of the nut 54. As the nut is tightened on the boss 52, the gland 55 is compressed around the armor 51 and thereby locks the armor against sliding.

Other means for actuating the valve 24 may be provided. For example, as in Figure 6, a structure 60 is built out from the body of the valve and carries a small cylinder 61 parallel to the axis of the body. A rocker arm 62 is pivoted between its ends at 63 in the structure 60. The cylinder 61 contains a slidable piston 64 which is pinned at 65 to one end of the member 62. The other end of this member is attached in like manner to the outer end of the valve 66 which corresponds to the valve 24 of Figure 2. As fluid pressure is admitted to the inlet 67 of the cylinder 61 against the piston 64, the rocker arm 62 is swung and pushes the valve 66 inward.

In Figure 8 a solenoid winding 70 is mounted on the valve housing on a parallel axis. A lever 71 is pivoted at one end by a pin 72 to the valve body or an extended portion thereof. The other end of the lever extends to a point adjacent to one end of the coil 70 and is connected to an armature 73 in the coil by means of a pin 74. At the opposite end of the coil is a magnet 75 which is energized when current is applied and attracts the armature 73 to rock the lever 71. An intermediate point of the lever is attached to the slip-in valve 76 corresponding to the valve 24, by a pin 77 or other suitable means. The described movement of the lever pushes the valve 76 inward in the manner set forth.

In the operation of the device, after the tractor has been coupled to the trailer, the operator pulls the valve 24 open and depresses the pedal 39. The duct 26 thereby passes pressure from the tractor tank 35 through duct 26, passage 22 and chamber 5 to push the pistons 18 outward and remove the valves 14 and 15 from their respective seats. The pistons 18 stop against the body sections 1 and 2 as in Figure 5, whereby to reduce the exposure of the rearward or outer areas of the piston assemblies. Pressure from the tractor tank may then also enter at inlet 7 and pass the open valve 15 to passage 10 and chamber 5 to maintain the open position of the valves 14 and 15 against the force produced by pressure acting against the aforementioned reduced exposed areas and the spring 20, after which the operator releases the valve 24 and the pedal 39. As the pedal is released, the pressure in inlet 6 and connected parts is exhausted through the quick release valve 49 or the port 41 as in the usual practice. The open valve 15 also transmits pressure from the tractor tank to load the trailer tank 46 and set the emergency valve 44 in the usual manner.

In the normal running of the tractor-trailer, the valves 14 and 15 are open as in Figure 5, and the operator applies the brakes when necessary by depressing the pedal 39. Pressure is delivered to the tractor brakes and trailer brakes through the usual channels. On the occurrence of an emergency the operator pulls the valve 24 open, and the pressure in chamber 5 is exhausted through passage 22, duct 26, inlet 6 and quick release valve 49, so that the valves 14 and 15 close on their seats. The tractor tank pressure is thereby conserved or shut out from the outlets 8 and 9 by the closing of the valves 14, 15. The operation in specific emergencies will now be described. It should be noted first that the closing of the valves 14 and 15 in any emergency, whereby the tractor tank pressure is conserved, permits normal operation of the tractor brakes. In other systems the emergency application valve 44 will not function until the tractor tank has become exhausted. With the present device, however, this time lag is eliminated, and the valve 44 operates immediately as will now be described, in addition to the normal functioning of the tractor brakes.

When the emergency line is severed or springs a leak, with or without damage to the service line 36', the chamber 5 exhausts through the leak, and the valves 14 and 15 close to conserve the tractor tank pressure in the manner set forth. The drop in pressure in the emergency line permits the valve 44 to open, so that the trailer brakes are applied by pressure from the tractor tank 46. The application of the trailer brakes is felt by the driver, and thereupon he applies the tractor brakes to stop the vehicle in normal fashion.

If the service line becomes severed, the operator will detect this condition when he depresses pedal 39 to open the control valve 38. Thereupon he will pull the valve 24 open to exhaust the chamber 5 through duct 26 to close the valves 14 and 15 and reduce the pressure in emergency line 37'. This drop in pressure operates the valve 44, and the tractor brakes may be operated normally as already described.

When parking with air brakes in an emergency and with other control apparatus, the service and emergency lines are liable to burst under overloading. The present device permits manually controlled operation of the valve 44 and consequent application of the trailer brakes to prevent this overloaded condition.

On disconnecting the trailer, the valves 14 and 15 close automatically as described in connection with breaking of the service and emergency lines, with the result that tractor tank pressure is not lost.

Finally, when connecting the tractor to a trailer on a grade, the driver can obtain immediate and complete control of both tractor and trailer brakes. He merely pulls the valve 24 open to set the valve 24 in the manner set forth in the general description given above, and the tractor and trailer brakes are operable in the usual manner from the pedal 39.

Figures 10 and 11 show a modified and preferred valve construction wherein the body is also slightly modified and carries the same numerals as Figures 2 and 5 for unchanged parts. In the inlets are mounted valve stems 13 and 14 carrying at their outer ends valve heads 13' and 14' adapted to close inward against valve seats 15 and 15' at the outer ends of the inlets. On the inner end of each valve stem is formed or mounted a piston 16 with a chevron seal 16' slidable in the corresponding enlarged chamber 12. A cylindrical wall 17 in each chamber 12 snugly receives a chevron seal 18 on the valve stem 13 or 14 to prevent leakage through the inlets 6, 7. The walls 17 also serve as outward stops for the outward movement of pistons 16.

Around each wall 17 is mounted a compressed spring 19', bearing against the corresponding piston, which is limited in its inward movement by the closing of its connected valve 13' or 14' against the corresponding seat 15 or 15'. The area of the pistons 16, 16' is so determined that the pressure thereon in the described running open position, overcomes the pressure on the corresponding valve 13' or 14' and also holds the corresponding spring 19' compressed.

Except in the particulars noted, the operation is as described in connection with Figures 2 and 5.

Although specific embodiments of the invention have been illustrated and described, it will be understood that various alterations in the details of construction will be made without departing from the scope of the invention as indicated by the appended claims.

What I claim is:

1. An automatic emergency valve comprising a body having opposed inlets, a chamber between said inlets, outlets respectively adjacent to said inlets, and a valve seat between each inlet and the adjacent outlet for connecting the same; a pair of opposed pistons slidable in said body and having their inner ends exposed to said chamber, valves attached to said pistons, springs bearing against said pistons and normally holding said valves closed against said seats, said valves being movable into said inlets, by pressure in said chamber, to open said inlets to said outlets, said body having a passage adapted to connect one of said inlets to said chamber, a valve normally obstructing said passage, means for opening said valve, said body having another passage from said chamber to the outlet adjacent to the other inlet.

2. An automatic emergency valve comprising a body having opposed inlets, a chamber between said inlets, outlets respectively adjacent to said inlets; a cylindrical wall between each inlet and the adjacent outlet and providing a seat connecting the same, a pair of opposed pistons slidable in said body and having their inner ends exposed to said chamber, cylindrical slip-in valves attached to said pistons and slidable in said seats, springs bearing against said pistons and normally holding said valve closed against said seats, said valves being movable into said inlets, by pressure in said chamber, to open said inlets to said outlets, said body having a passage adapted to connect one of said inlets to said chamber, a valve normally obstructing said passage, means for opening said valve, said body having another passage from said chamber to the outlet adjacent to the other inlet.

3. An automatic emergency valve comprising a body having opposed inlets, a chamber between said inlets, outlets respectively adjacent to said inlets, and a valve seat between each inlet and the adjacent outlet for connecting the same; a pair of opposed pistons slidable in said body and having their inner ends exposed to said chamber, valves attached to said pistons, springs bearing against said pistons and normally holding said valves closed against said seats, stops at said chambers for limiting the movement of said pistons by said springs, said valves being movable into said inlets, by pressure in said chamber, to open said inlets to said outlets, said body having a passage adapted to connect one of said inlets to said chamber, a valve normally obstructing said passage, means for opening said valve, said body having another passage from said chamber to the outlet adjacent to the other inlet.

4. An automatic emergency valve comprising a body having opposed inlets, a chamber between said inlets, outlets respectively adjacent to said inlets; a cylindrical wall between each inlet and the adjacent outlet and providing a seat connecting the same, a pair of opposed pistons slidable in said body and having their inner ends exposed to said chamber, cylindrical slip-in valves attached to said pistons and slidable in said seats, springs bearing against said pistons and normally holding said valve closed against said seats, stops at said chambers for limiting the movement of said pistons by said springs, said valves being movable into said inlets, by pressure in said chamber, to open said inlets to said outlets, said body having a passage adapted to connect one of said inlets to said chamber, a valve normally obstructing said passage, means for opening said valve, said body having another passage from said chamber to the outlet adjacent to the other inlet.

5. An automatic emergency valve comprising a body having opposed inlets, a chamber between said inlets, outlets respectively adjacent to said inlets, and a valve seat between each inlet and the adjacent outlet for connecting the same; a pair of opposed pistons slidable in said body and having their inner ends exposed to said chamber, valve stems extending from said pistons outwardly toward said valve seats, valves carried by the outer ends of said stems and adapted to close inwardly on said seats, springs bearing against said pistons and normally holding said valves closed againt said seats, said valves being movable into said inlets, by pressure in said chamber, to open said inlets to said outlets, said body having a passage adapted to connect one of said inlets to said chamber, a valve normally obstructing said passage, means for opening said valve, said body having another passage from said chamber to the outlet adjacent to the other inlet.

6. An automatic emergency valve comprising a body having opposed inlets, a chamber between said inlets, outlets respectively adjacent to said inlets, and a valve seat between each inlet and the adjacent outlet for connecting the same, a pair of opposed pistons slidable in said body and having their inner ends exposed to said chamber, valve stems extending from said pistons outwardly toward said valve seats, valves carried by the outer ends of said stems and adapted to close inwardly on said seats, said body having a cylindrical wall surrounding each valve stem and engaged by the corresponding piston on outward movement thereof, springs surrounding said walls and bearing against said pistons and normally holding said valves closed against said seats, said valves being movable into said inlets, by pressure in said chamber, to open said inlets to said outlets, said body having a passage adapted to connect one of said inlets to said chamber, a valve normally obstructing said passage, means for opening said valve, said body having another passage from said chamber to the outlet adjacent to the other inlet.

No references cited.